United States Patent
Yang

(10) Patent No.: US 12,379,771 B2
(45) Date of Patent: Aug. 5, 2025

(54) DEVICE INTERACTIVE METHOD, SYSTEM, AND DEVICE

(71) Applicant: GOERTEK INC., Shandong (CN)

(72) Inventor: Chunhua Yang, Shandong (CN)

(73) Assignee: GOERTEK INC., Weifang (CN)

( * ) Notice: Subject to any disclaimer, the term of this patent is extended or adjusted under 35 U.S.C. 154(b) by 0 days.

(21) Appl. No.: 18/559,688

(22) PCT Filed: Jun. 28, 2021

(86) PCT No.: PCT/CN2021/102824
§ 371 (c)(1),
(2) Date: Nov. 8, 2023

(87) PCT Pub. No.: WO2022/236937
PCT Pub. Date: Nov. 17, 2022

(65) Prior Publication Data
US 2024/0241575 A1    Jul. 18, 2024

(30) Foreign Application Priority Data

May 14, 2021 (CN) .......................... 202110527719.0

(51) Int. Cl.
*G06F 3/01*        (2006.01)
*G06F 3/0354*    (2013.01)

(52) U.S. Cl.
CPC .......... *G06F 3/011* (2013.01); *G06F 3/03547* (2013.01)

(58) Field of Classification Search
CPC . G06F 3/01; G06F 3/011; G06F 3/017; G06F 3/03547; G06F 3/042; G06F 3/043; G06F 3/0488; G06F 3/0346; G06F 3/0425
See application file for complete search history.

(56) References Cited

U.S. PATENT DOCUMENTS

2007/0106942 A1* 5/2007 Sanaka ................... G06F 21/31
                                                                            715/764
2012/0173983 A1* 7/2012 Song ..................... G06F 3/0485
                                                                            715/863
(Continued)

FOREIGN PATENT DOCUMENTS

CN            101531216 A      9/2009
CN            106527722 A      3/2017
(Continued)

OTHER PUBLICATIONS

International Search Report from International Application No. PCT/CN2021/102824 mailed Feb. 10, 2022.

*Primary Examiner* — Stephen G Sherman
(74) *Attorney, Agent, or Firm* — Shih IP Law Group, PLLC

(57) ABSTRACT

A device operating method, a device operating system, and a device, including: pre-establishing an instruction coordinate system, the instruction coordinate system and a reference orientation satisfying a preset position relationship; during use of the device, determining the current orientation in which the user is positioned with respect to the device, and adjusting the instruction coordinate system based on the current orientation and the reference orientation, such that the instruction coordinate system after adjustment and the current orientation satisfy the preset position relationship, and the position of the center of an interactive module in the instruction coordinate system after adjustment is the same as the position thereof in the instruction coordinate system before adjustment.

8 Claims, 3 Drawing Sheets

(56) References Cited

U.S. PATENT DOCUMENTS

2014/0354695 A1* 12/2014 Sakai ................ H04N 21/4312
                                                       345/650
2019/0246172 A1*  8/2019 Cheong .................... G06F 3/01

FOREIGN PATENT DOCUMENTS

| CN | 107850969 A |  3/2018 |
|----|-------------|---------|
| CN | 108961343 A | 12/2018 |
| CN | 109144267 A |  1/2019 |
| CN | 109508093 A |  3/2019 |
| CN | 110197461 A |  9/2019 |
| CN | 110497381 A | 11/2019 |
| CN | 111316207 A |  6/2020 |
| WO | 2017133498 A1 | 8/2017 |

* cited by examiner

DEVICE INTERACTIVE METHOD, SYSTEM, AND DEVICE

CROSS REFERENCE TO RELATED APPLICATIONS

This application claims the priority to the Chinese patent application No. 202110527719.0, entitled "A DEVICE OPERATING METHOD, SYSTEM, AND DEVICE" filed with the China Patent Office on May 14, 2021, the entire contents of which are incorporated herein by reference.

TECHNICAL FIELD

The present disclosure relates to a technical field of device control, particularly, to a device operating method, system and the device.

BACKGROUND

Many existing devices are provided with a UI (User Interface) module, and the UI module is generally provided with mechanical buttons or touch buttons whose positions are fixed. Taking the device being a loudspeaker as an example, many loudspeakers on the existing market are cylindrical or cuboid to achieve a 360° sound field, so that users can have a good listening effect in all directions. However, due to the fixed positions of the function keys on the UI module of those loudspeakers, the user may be positioned in different orientations with respect to the loudspeaker during use. Each time the operation is performed, the relative position of each function key with respect to the user may be different, and thereby the user needs to carefully identify the function of each key to operate, which reduces the user's experience.

SUMMARY

The purpose of the present disclosure is to provide a device operating method, system and device, which do not require the user to identify the interactive module due to the change in orientation, and can realize a blind operation in a certain extent, thereby improving the user's experience.

In order to solve the above-mentioned technical problems, the present disclosure provides a device operating method, wherein an interactive module is disposed on the top of the device, and wherein the operating method includes:
 pre-establishing an instruction coordinate system of the interactive module, wherein a relationship between the instruction coordinate system and a reference orientation of the interactive module satisfies a preset position relationship;
 determining a current orientation in which a user is positioned with respect to the device;
 adjusting the instruction coordinate system according to the current orientation and the reference orientation, such that the instruction coordinate system after adjustment satisfies the preset position relationship with the current orientation; wherein a position of a center of the interactive module in the instruction coordinate system after adjustment is the same as a position thereof in the instruction coordinate system before adjustment; and
 generating an operation instruction of the device based on the instruction coordinate system after adjustment and user's operation action on the interactive module.

Preferably, the device further includes a plurality of proximity sensors disposed on a side thereof; and determining a current orientation in which a user is positioned with respect to the device includes:
 determining a distance between the user and the proximity sensor obtained based on data acquired by the proximity sensor when the user enters detection range of the proximity sensor; and
 determining the current orientation in which the user is positioned with respect to the device based on at least two determined distances between the user and the proximity sensor.

Preferably, the proximity sensor is an ultrasonic sensor, a lidar sensor or an infrared TOF proximity sensor.

Preferably, generating an operation instruction of the device based on the instruction coordinate system after adjustment and the user's operation action on the interactive module includes:
 determining an operation path of a user's operation action on the interactive module in the instruction coordinate system after adjustment based on the operation action; and
 generating an operation instruction of the device based on the determined operation path and a preset operation path and operation instruction correspondence relationship.

Preferably, a first coordinate axis of the instruction coordinate system satisfies a preset position relationship with the reference orientation, and the first coordinate axis is a horizontal ordinate axis or a longitudinal coordinate axis.

Preferably, the operation action includes a click operation and/or a sliding operation.

Preferably, the sliding operation includes clockwise sliding and/or counterclockwise sliding and/or linear sliding from a first direction to a second direction, wherein the second direction is opposite to the first direction.

Preferably, adjusting the instruction coordinate system according to the current orientation and the reference orientation, such that the instruction coordinate system after adjustment satisfies the preset position relationship with the current orientation, includes:
 determining a preset rotation direction and a rotation angle, wherein the preset rotation direction includes a counterclockwise direction or a clockwise direction, and the rotation angle is an angle rotating from the reference orientation to the current orientation in the preset rotation direction; and
 controlling the instruction coordinate system to rotate the rotation angle in the preset rotation direction by taking a center of the interactive module as a rotation point.

In order to solve the above-mentioned technical problems, the present disclosure further provides a device operating system, wherein an interactive module is disposed on the top of the device, and wherein the operating system includes:
 an instruction coordinate system establishing module configured to pre-establish an instruction coordinate system of the interactive module, wherein the instruction coordinate system satisfies a preset position relationship with a reference orientation;
 an orientation determining module configured to determine a user's current orientation at the device;
 an instruction coordinate system adjustment module configured to adjust the instruction coordinate system according to the current orientation and the reference orientation, such that the instruction coordinate system after adjustment satisfies the preset position relationship with the current orientation; wherein a position of a center of the interactive module in the instruction coordinate system after adjustment is the same as a position thereof in the instruction coordinate system before adjustment; and an operation instruction generation module configured to generate an operation instruction of the device based on the instruction coordinate system after adjustment and the user's operation action on the interactive module.

In order to solve the above-mentioned technical problems, the present disclosure further provides a device, wherein an interactive module is disposed on a top of the device and wherein the device further includes:

a memory configured to store a computer program;

a processor configured to implement steps of the device operating method as described above when executing the computer program.

The present disclosure provides a device operating method, pre-establishing an instruction coordinate system, wherein the instruction coordinate system satisfies a preset position relationship with a reference orientation; determining a current orientation in which user is positioned with respect to the device during use of the device; adjusting the instruction coordinate system according to the current orientation and the reference orientation, such that the instruction coordinate system after adjustment satisfies the preset position relationship with the current orientation, and a position of a center of the interactive module in the instruction coordinate system after adjustment is the same as a position thereof in the instruction coordinate system before adjustment. It can be seen that the current orientation at this moment is equivalent to the reference orientation. In this way, no matter the user is positioned at which orientation with respect to the device, the user can operate the interactive module of the device as if the user is positioned at the reference orientation with respect to the device, and the user does not need to intentionally identify the interactive module due to change in the orientation and can achieve blind operation in a certain extent, thereby improving the user's experience.

The present disclosure also provides a device operating system and device, which have the same beneficial effect as the device operating method as described above.

BRIEF DESCRIPTION OF DRAWINGS

In order to more clearly illustrate the technical solutions in the embodiments of the present disclosure, the accompanying drawings which may be used in the related art and the embodiments will be briefly introduced hereinafter. Obviously, the accompanying drawings in the following description are only some embodiments of the present disclosure, and for those of ordinary skill in the art, other drawings can also be obtained based on these drawings without any creative work.

DETAILED DESCRIPTIONS

The core of the present disclosure is to provide a device operating method, a device operating system and a device, which do not require the user to intentionally identify the interactive module due to change in orientation, and can realize blind operation in a certain extent, thereby improving user's experience.

In order to make the purpose, technical solutions and advantages of the embodiments of the present disclosure clearer, the technical solutions in the embodiments of the present disclosure will be clearly and completely described below in conjunction with the drawings in the embodiments of the present disclosure. Obviously, the described embodiments is a part of embodiments of the present disclosure, not all embodiments. Based on the embodiments of the present disclosure, all other embodiments obtained by persons of ordinary skill in the art without making creative work fall in the protection scope of the present disclosure.

Figure 1:
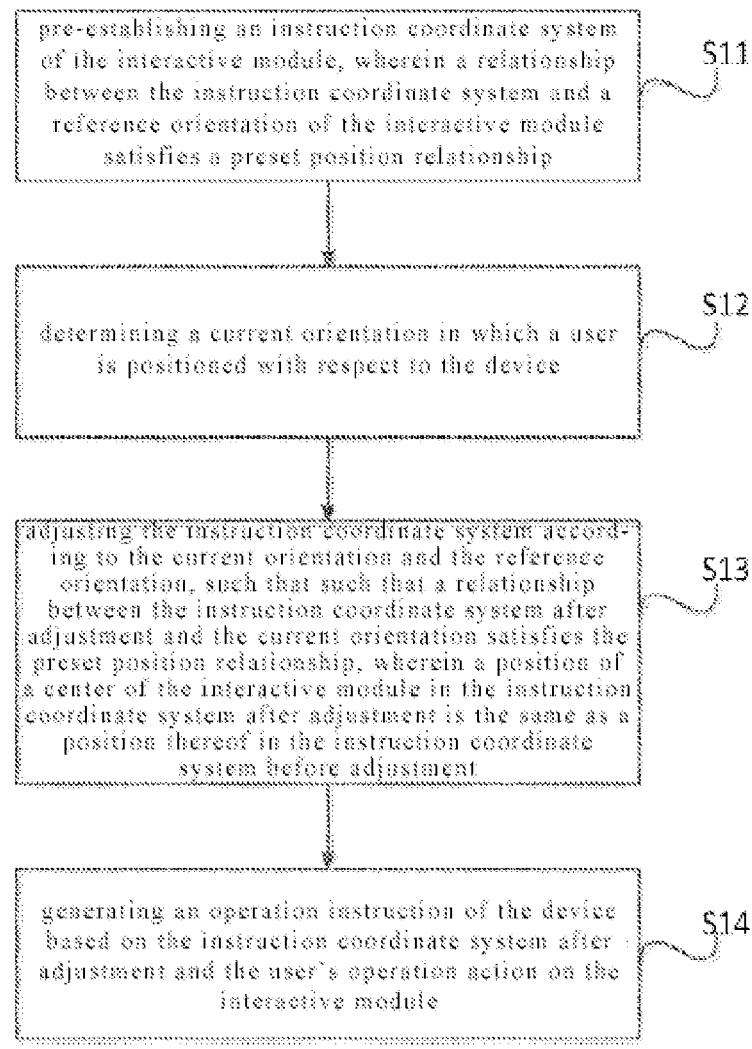
FIG. 1 is a flowchart of a device operating method according to the present disclosure.

Please refer to FIG. 1, which is a flowchart of a device operating method according to the present disclosure.

An interactive module is disposed on the top of the device, and the device operating method includes:

S11: pre-establishing an instruction coordinate system of the interactive module, wherein the instruction coordinate system satisfies a preset position relationship with a reference orientation of the interactive module;

S12: determining a current orientation in which a user is positioned with respect to the device;

S13: adjusting the instruction coordinate system according to the current orientation and the reference orientation, such that the instruction coordinate system after adjustment satisfies the preset position relationship with the current orientation; wherein a position of a center of the interactive module in the instruction coordinate system after adjustment is the same as a position thereof in the instruction coordinate system before adjustment; and S14: generating an operation instruction of the device based on the instruction coordinate system after adjustment and the user's operation action on the interactive module.

It should be noted that the device may be a loudspeaker, etc., and the shape of the device may be, but not limited to, a cylinder or a cuboid. The interactive module is disposed on the top of the device, so that the user can operate the interactive module at different orientations with respect to the device. The interactive module is used to recognize the user's operation action, and obtain the operation path of the operation action through its own instruction coordinate system, to generate the operation instruction of the device based on the operation path. In practical using, it is necessary to pre-establish each of the operation paths, and the correspondence relationship between the operation path and the operation instruction.

Figure 2:
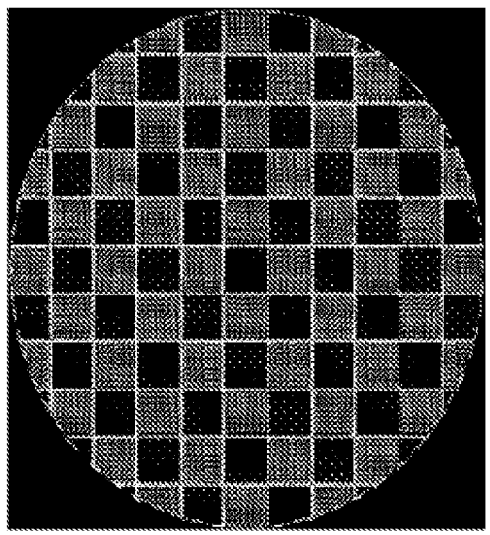
FIG. 2 is a principle diagram of a matrix-type multi-pad of a matrix grid touch pad according to the present disclosure.

Further, the interactive module may be a matrix grid touchpad (without a display screen) or a touch screen (with a display screen), and the user operates such two interactive modules by touching. Please refer to FIG. 2, FIG. 2 is a principle diagram of a matrix-type multi-pad of a matrix grid touch pad according to the present disclosure. The matrix grid touch pad adopts a matrix type multi-pad manner and can recognize user's touch operations. The interactive module may also be a gesture recognition module based on millimeter wave. In a manner of based on the millimeter wave, the user can operate the interactive module without contact, and the operation track is the same as that of the interactive module with contact.

Specifically, the interactive module has its own instruction coordinate system, and the user's operation action on the interactive module determines the operation path of the operation action on the instruction coordinate system. Considering that in the related art, the instruction coordinate system of the interactive module is fixed, once the orientation of the interactive module in which the user is positioned changes, the user may need to change the operation action on the interactive module in order to correctly operate the device. For example, in order to perform an A function control on the device, the user needs to perform an operation of sliding from left to right on the interactive module when standing in the reference orientation. On the other hand, the user needs to perform an operation of sliding from right to left on the interactive module when standing in an orientation opposite to the reference orientation in order to control the A function of the device. It can be seen that in order to achieve the same function, the user needs to perform different operations when standing in different orientations, which reduces the user's experience, that is, supposing that the sliding operation includes four orientations of upward, downward, leftward and rightward, in the conventional loudspeaker's touch screen, the received operation path in the case where the user performs rightward sliding operation when standing in front of the loudspeaker (for the purpose of playing the next song), and the received operation path in the case where the user performs leftward sliding when standing at the rear side of the loudspeaker (for the purpose of playing the previous song) are consistent, as a result, the purposes to be achieved by the loudspeaker itself are all to play either the previous song or the next song.

In order to solve the above technical problems, in this application, the instruction coordinate system is not fixed. The user's current orientation with respect to the device is always taken as the new reference orientation during the using of the device, and the instruction coordinate system always satisfies a preset position relationship with the user's current orientation. In addition, the position of the center of the interactive module in the instruction coordinate system after adjustment is the same as the position thereof in the instruction coordinate system before adjustment. Wherein, the preset position relationship herein may refer to that the pointing direction of a certain axis in the instruction coordinate system is the same as or opposite to the direction of the reference orientation, for example, the pointing direction of the horizontal coordinate axis of the instruction coordinate system is the same or opposite to the reference orientation, or the pointing direction of the longitudinal coordinate axis of the instruction coordinate system is the same as or opposite to the reference orientation, which can be set according to requirements. Specifically, taking the interactive module as the center, the instruction coordinate system and the reference orientation of the interactive module satisfy the preset position relationship, and the position of the center of the interactive module in the instruction coordinate system after adjustment is the same as the position thereof in the instruction coordinate before adjustment, each operation path in the above-mentioned correspondence relationship is the operation path generated when the user operates the interactive module when standing in the reference orientation.

When the user is using the device, the device determines the current orientation in which the user is positioned with respect to the device. Since the reference orientation is determined, the relative position relationship between the current orientation and the reference orientation is also determined. Based on this, the position of the instruction coordinate system may be adjusted according to the relative position relationship between the current orientation and the reference orientation, so that the instruction coordinate system after adjustment and the current orientation satisfy the preset position relationship, and the position of the center of the interactive module in the instruction coordinate system after adjustment is the same as the position thereof in the instruction coordinate system before adjustment. Since the instruction coordinate system after adjustment and the current orientation satisfy the preset position relationship, and the position of the center of the interactive module in the instruction coordinate system after adjustment is the same as the position thereof in the instruction coordinate system before adjustment, the current orientation is equivalent to the reference orientation, and an operation instruction of the device can be subsequently generated based on the instruction coordinate system after adjustment and the user's operation action on the interactive module. Furthermore, the user has no need to consider to change the operation action due to the change in the user's orientation when operating the interactive module, that is, for a certain function, no matter which orientation the user stands with respect to the device, the operation action is the same. It can be seen that the solution of the present application is like adjusting the orientation of the interactive module so that the orientation of the interactive module always faces the user.

It should be noted that in practical applications, the reference orientation in S11 may be fixed by default, such as the orientation of 0 degree with respect to the device. Then, after the user operation on the device subsequently completes and the user leaves the device, the instruction coordinate system returns to the default position and satisfies the preset position relationship with the default fixed reference orientation. Of course, for the user's current operation on the device, the reference orientation in S11 may also be the user's latest current orientation from the current time. In this way, after the user operation on the device currently completes and the user leaves the device, the instruction coordinate system does not need to change the location, and the user's current orientation in this time may also be used as the reference orientation at the time when the user approaches the device for the next time. Which method is specifically adopted depends on the actual situation.

To sum up, according to the device operating method provided by the present disclosure, the user's current orientation is equivalent to the reference orientation. In this way, no matter which orientation the user stands with respect to the device, the user can operate the interactive module of the device as if standing in the reference orientation with respect to the device, and the user does not need to intentionally identify the interactive module due to change in the orientation and can achieve blind operation in a certain extent, thereby improving the user's experience.

On the basis of above-mentioned embodiment:
As a preferred embodiment, the device further includes a plurality of proximity sensors disposed on a side thereof;
determining a current orientation in which a user is positioned with respect to the device includes:
determining a distance between the user and the proximity sensor obtained based on data acquired by the proximity sensor when the user enters the detection range of the proximity sensor; and
determining the current orientation in which a user is positioned with respect to the device based on at least two determined distances between the user and the proximity sensor.

Figure 3:
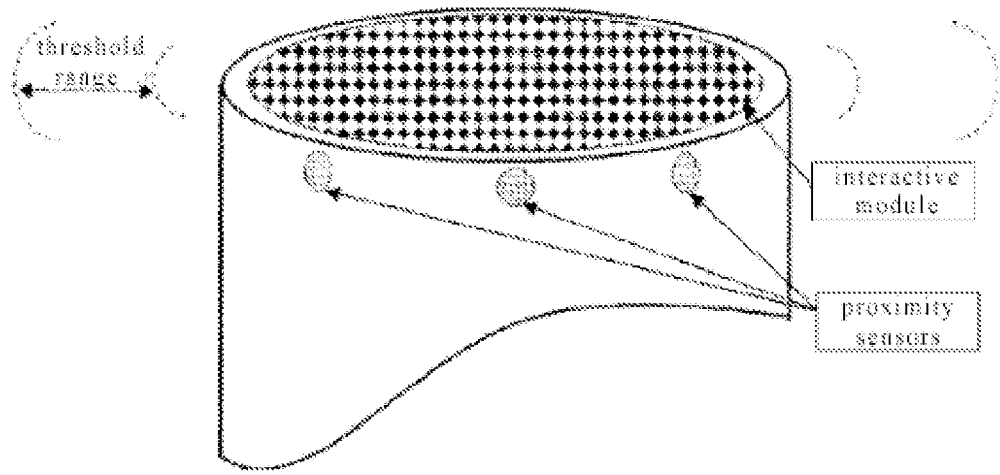
FIG. 3 is a partial schematic diagram of a device according to the present disclosure.

Please refer to FIG. 3, FIG. 3 is a partial schematic diagram of a device according to the present disclosure. The device is a cylinder, and the interactive module is a touch pad, the interactive module is disposed on the top of the device. A plurality of proximity sensors are evenly disposed on the side of the interactive module, so as to achieve the purpose of 360-degree detection of the user's orientation. In practical using, it can be determined how many proximity sensors are disposed on the side of the interactive module according to the detection range of the proximity sensor. The distance threshold can be set as required. Only when the user approaches the device within a certain range, can it be detected by the proximity sensor. Only when the user enters the range of the threshold distance, it is can be considered as effective approaching.

Specifically, when the user enters the detection range of the proximity sensors, it will be detected by at least two proximity sensors, and the distance between the user and the proximity sensors can be determined based on the data collected by the at least two proximity sensors. The current orientation in which a user is positioned with respect to the device can be determined based on the determined distance between the user and the proximity sensors.

It should be noted that the proximity sensor can directly determine the distance between itself and the user according to the data collected by itself, or can transmit the data collected by itself to the processor of the device, and the processor calculates the distance between the proximity sensor and the user. Which method to specifically adopt can be determined according to the actual situation.

It can be seen that, the current orientation in which a user is positioned with respect to the device can be determined by the method according to the present disclosure, and the accuracy and reliability are high.

As a preferred embodiment, the proximity sensor is an ultrasonic sensor, a lidar sensor, or an infrared TOF (Time of flight) proximity sensor.

Specifically, the ultrasonic sensor has the advantage of good directionality, the lidar sensor has the advantages of high precision, large range, and strong resistance to light and electrical interference, and the infrared TOF proximity sensor can accurately detect objects in a short time and is not affected by humidity, air pressure and temperature.

Of course, other types of proximity sensors can also be used herein, and the present application does not make any particular limitations thereto.

As a preferred embodiment, generating an operation instruction of the device based on the instruction coordinate system after adjustment and the user's operation action on the interactive module includes:
 determining an operation path of the user's operation action on the interactive module in the adjusted instruction coordinate system based on the operation action; and
 generating an operation instruction of the device based on the determined operation path and a preset operation path and the operation instruction correspondence relationship.

Specifically, the correspondence between the operation path in the instruction coordinate system and each operation instruction can be established in advance, wherein the sliding operation herein includes click operation, sliding operation, etc. When the user subsequently operate the interactive module, the operation path of the operation action in the instruction coordinate system after adjustment can be determined at first based on the user's operation on the interactive module, and then, the operation instruction for the device is generated based on the determined operation path and the preset operation path and the operation instruction correspondence relationship, so as to achieve the control of the device.

It can be seen that, the present application generates operation instruction for the device based on the instruction coordinate system after adjustment and the user's operation actions on the interactive module, and the user does not need to intentionally identify the interactive module due to the change in orientation, and blind operation can be achieved in a certain extent, which improves the user's experience.

As a preferred embodiment, a first coordinate axis of the instruction coordinate system satisfies a preset position relationship with the reference orientation, and the first coordinate axis is a horizontal ordinate axis or a longitudinal coordinate axis.

Specifically, the instruction coordinate system includes the origin, the horizontal ordinate axis, and the longitudinal coordinate axis. In order to facilitate to determine the position relationship between the instruction coordinate system and the reference orientation, the position relationship between the horizontal ordinate axis in the instruction coordinate system and the reference orientation may be determined, or the position relationship between the longitudinal coordinate axis in the instruction coordinate system and the reference orientation may be determined. Of course, the position relationship between other fixed axes in the instruction coordinate system and the reference orientation may also be determined, which is not specifically limited in this application.

As a preferred embodiment, the operation action includes a click operation and/or a sliding operation.

In the present application, the user can perform a click operation or a sliding operation on the interactive module, wherein the click operation can include a single click or a double click, and the sliding operation can be a linear sliding or a curved sliding, which will not be specifically limited in the present application. In this way, various operations on the interactive modules are achieved.

As a preferred embodiment, the sliding operation includes clockwise sliding and/or counterclockwise sliding and/or linear sliding from a first direction to a second direction, wherein the second direction is opposite to the first direction.

Specifically, the sliding operation may include curved sliding, such as clockwise sliding or counterclockwise sliding, may also include linear sliding, such as sliding from the first direction to the second direction, and may also include zigzag sliding, and which method to specifically adopt depends on the actual situation.

As a preferred embodiment, adjusting the instruction coordinate system according to the current orientation and the reference orientation, such that the instruction coordinate system after adjustment satisfies the preset position relationship with the current orientation, includes:
 determining a preset rotation direction and a rotation angle, wherein the preset rotation direction includes a counterclockwise direction or a clockwise direction, and the rotation angle is an angle rotating from the reference orientation to the current orientation in the preset rotation direction; and
 controlling the instruction coordinate system to rotate the rotation angle in the preset rotation direction by taking a center of the interactive module as a rotation point.

Specifically, in practical use, the rotation direction of the instruction coordinate system may be determined in advance, and the preset rotation direction may be clockwise or counterclockwise. After the position relationship between the current orientation and the reference orientation is determined, the rotation angle of the instruction coordinate system can be determined based on the preset rotation direction, wherein the rotation angle is an angle rotating from the reference orientation to the current orientation in the preset rotation direction. Then, the instruction coordinate system is controlled to rotate the rotation angle in the preset rotation direction by taking a center of the interactive module as a rotation point, so that the rotated instruction coordinate system and the current orientation may satisfy the preset position relationship, and the position of the center of the interactive module in the instruction coordinate system after adjustment is the same as is position thereof in the instruction coordinate system before adjustment.

It can be seen that the adjustment of the instruction coordinate system can be achieved simply and reliably in this way.

Of course, in practical use, the rotation direction may not be determined in advance, but an angle between the current orientation and the reference orientation smaller than 180 degrees (another angle is that 360 degrees subtracts this angle) may be determined at first, and this angle is used as the rotation angle, and the rotation direction is determined based on the rotation angle, so that after the instruction coordinate system rotates the rotation angle in the preset rotation direction by taking a center of the interactive module as a rotation point, the instruction coordinate system and the current orientation satisfy the preset position relationship, and the position of the center of the interactive module in the instruction coordinate system after adjustment is the same as a position thereof in the instruction coordinate system before adjustment.

Which adjustment method to specifically adopt can be determined according to the actual situation.

Figure 4:
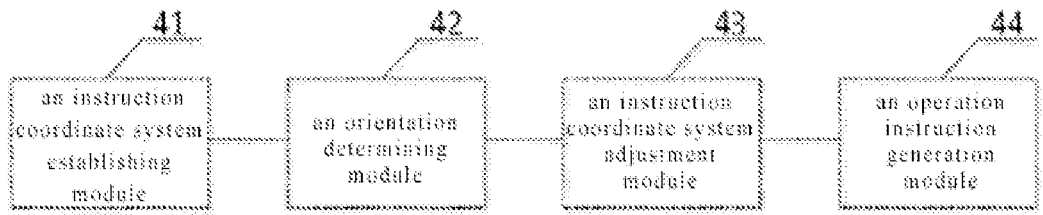
FIG. 4 is a schematic structural diagram of a device operating system according to the present disclosure.

Please refer to FIG. 4, FIG. 4 is a schematic structural diagram of a device operating system according to the present disclosure.

An interactive module is disposed on the top of the device, and the device operating system includes:
  an instruction coordinate system establishing module 41 configured to pre-establish an instruction coordinate system of the interactive module, wherein the instruction coordinate system satisfies a preset position relationship with a reference orientation;
  an orientation determining module 42 configured to determine a current orientation in which user is positioned with respect to the device;
  an instruction coordinate system adjustment module 43 configured to adjust the instruction coordinate system according to the current orientation and the reference orientation, such that the instruction coordinate system after adjustment satisfies the preset position relationship with the current orientation; wherein a position of a center of the interactive module in the instruction coordinate system after adjustment is the same as a position thereof in the instruction coordinate system before adjustment; and
  an operation instruction generation module 44 configured to generate an operation instruction of the device based on the instruction coordinate system after adjustment and the user's operation action on the interactive module.

For the descriptions of the device operating system according to the present disclosure, please refer to the foregoing method embodiment, and the present disclosure will not be duplicated here.

Figure 5:
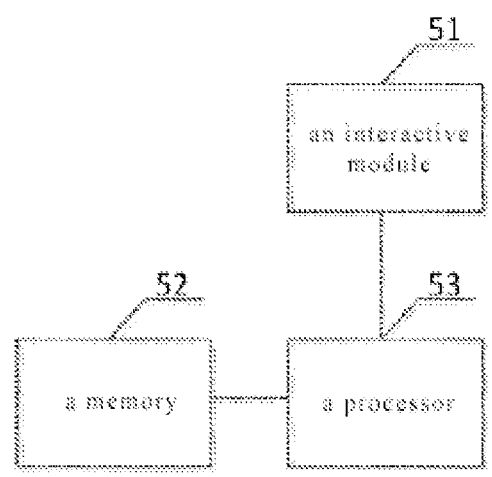
FIG. 5 is a schematic structural diagram of a device according to the present disclosure.

Please refer to FIG. 5, which is a schematic structural diagram of a device according to the present disclosure. An interactive module 41 is disposed on a top of the device, the device further includes:
  a memory 52 configured to store a computer program;
  a processor 53 configured to implement steps of the the device operating method as described above when executing the computer program.

For the descriptions of the device according to the present disclosure, please refer to the foregoing method embodiment, and the present disclosure will not be duplicated here.

It should be noted that in this specification, relationship terms such as first and second are only used to distinguish an entity or operation from another entity or operation, and do not necessarily require or imply that there are any such actual relationship or order between these entities or operations. Furthermore, the term "comprises", "includes" or any other variation thereof is intended to cover a non-exclusive inclusion, such that a process, method, article, or device including a series of elements includes not only those elements, but also includes elements not expressly listed herein or also includes elements inherent in such a process, method, article, or device. Without further limitations, an element defined by the phrase "comprising a . . . " does not preclude the presence of additional identical elements in the process, method, article or device comprising said element.

The above description of the disclosed embodiments is provided to enable any person skilled in the art to implement or make use of the present disclosure. Various modifications to these embodiments will be readily apparent to those skilled in the art, and the general principles defined herein may be implemented in other embodiments without departing from the spirit or scope of the disclosure. Therefore, the present disclosure will not be limited to the embodiments illustrated herein, but is to be accorded the widest scope consistent with the principles and novel features disclosed herein.

What is claimed is:

1. A device operating method, wherein an interactive module is disposed on top of a device, and the device operating method comprises:
  pre-establishing an instruction coordinate system of the interactive module, wherein a relationship between the instruction coordinate system and a reference orientation of the interactive module satisfies a preset position relationship;
  determining a current orientation in which a user is positioned with respect to the device;
  adjusting the instruction coordinate system according to the current orientation and the reference orientation, such that a relationship between the instruction coordinate system after adjustment and the current orientation satisfies the preset position relationship, wherein a position of a center of the interactive module in the instruction coordinate system after adjustment is the same as a position of a center of the interactive module in the instruction coordinate system before adjustment; and
  generating an operation instruction of the device based on the instruction coordinate system after adjustment and a user's operation action on the interactive module;
  wherein adjusting the instruction coordinate system according to the current orientation and the reference orientation such that a relationship between the instruction coordinate system after adjustment and the current orientation satisfies the preset position relationship, comprises:
  determining a preset rotation direction and a rotation angle, wherein the preset rotation direction comprises a counterclockwise direction or a clockwise direction, and the rotation angle is an angle rotating from the reference orientation to the current orientation in the preset rotation direction; and controlling the instruction coordinate system to rotate the rotation angle in the preset rotation direction by taking a center of the interactive module as a rotation point.

2. The device operating method according to claim 1, wherein the device further comprises a plurality of proximity sensors disposed on a side thereof; and wherein determining a current orientation in which a user is positioned with respect to the device comprises:

determining a distance between the user and each of the plurality of proximity sensors obtained based on data acquired by the plurality of proximity sensors when the user enters a detection range of the proximity sensor; and determining the current orientation in which the user is positioned with respect to the device based on at least two determined distances between the user and the respective proximity sensors.

3. The device operating method according to claim 2, wherein the proximity sensor is an ultrasonic sensor, a lidar sensor or an infrared TOF proximity sensor.

4. The device operating method according to claim 1, wherein generating an operation instruction of the device based on the instruction coordinate system after adjustment and the user's operation action on the interactive module comprises:

determining an operation path of the user's operation action on the interactive module in the instruction coordinate system after adjustment based on the operation action; and generating an operation instruction of the device based on the determined operation path and a preset operation path-instruction correspondence.

5. The device operating method according to claim 1, wherein a relationship between a first coordinate axis of the instruction coordinate system and the reference orientation satisfies the preset position relationship, and the first coordinate axis is a horizontal ordinate axis or a longitudinal coordinate axis.

6. The device operating method according to claim 1, wherein the operation action comprises a click operation and/or a sliding operation.

7. The device operating method according to claim 6, wherein the sliding operation comprises a clockwise sliding and/or a counterclockwise sliding and/or a linear sliding from a first direction to a second direction, the second direction is opposite to the first direction.

8. A device, wherein an interactive module is disposed on top of the device, and the device further comprises:

a memory configured to store a computer program; and a processor configured to implement steps of the device operating method according to claim 1 when executing the computer program.

* * * * *